United States Patent [19]
Schmidt

[11] 3,788,069
[45] Jan. 29, 1974

[54] LIQUID FUELED ROCKET ENGINE OF THE MAIN CURRENT TYPE HAVING SEPARATE CONTROL NOZZLES OPERATED FROM TURBINE EXHAUST GASES BRANCHED OFF FROM THE ROCKET PROCESS

[75] Inventor: Gunther Schmidt, Ottobrunn, Germany

[73] Assignee: Messerschmitt-Bolkow-Blohm GmbH, Munchen, Germany

[22] Filed: Aug. 18, 1972

[21] Appl. No.: 281,647

[30] Foreign Application Priority Data
Sept. 8, 1971    Germany................ P 21 44 819.1

[52] U.S. Cl....................... 60/207, 60/211, 60/224, 60/229, 60/246, 60/261, 60/263
[51] Int. Cl............................................. F02k 9/02
[58] Field of Search..... 60/224, 225, 229, 246, 263, 60/205, 207, 261, 211

[56] References Cited
UNITED STATES PATENTS
3,577,735  5/1971  Schmidt................................ 60/207
3,045,596  7/1962  Rae....................................... 60/229 X
3,134,224  5/1964  Lippincott et al. ............ 60/39.07 X
2,408,111  9/1946  Truax et al. ...................... 60/261 X
2,974,594  3/1961  Boehm.............................. 60/229 X

OTHER PUBLICATIONS

Stehling, K. R., Vernier Engines for Controls, Guidance, Acceleration, Braking, Space/Aeronautics, Aug., 1960, pp. 49–51.

Primary Examiner—Carlton R. Croyle
Assistant Examiner—Robert E. Garrett
Attorney, Agent, or Firm—John J. McGlew et al.

[57] ABSTRACT

A liquid fueled rocket engine of the so-called main current type in which combustion gases are generated in a precombustion chamber and directed in series to a fuel component pump drive turbine and to a main combustion chamber for generating thrust gases, includes one or more control nozzles or control nozzle groups which are connected to receive the exhaust gases from the turbine with the addition of small partial amounts of a propellant component.

9 Claims, 1 Drawing Figure

PATENTED JAN 29 1974  3,788,069
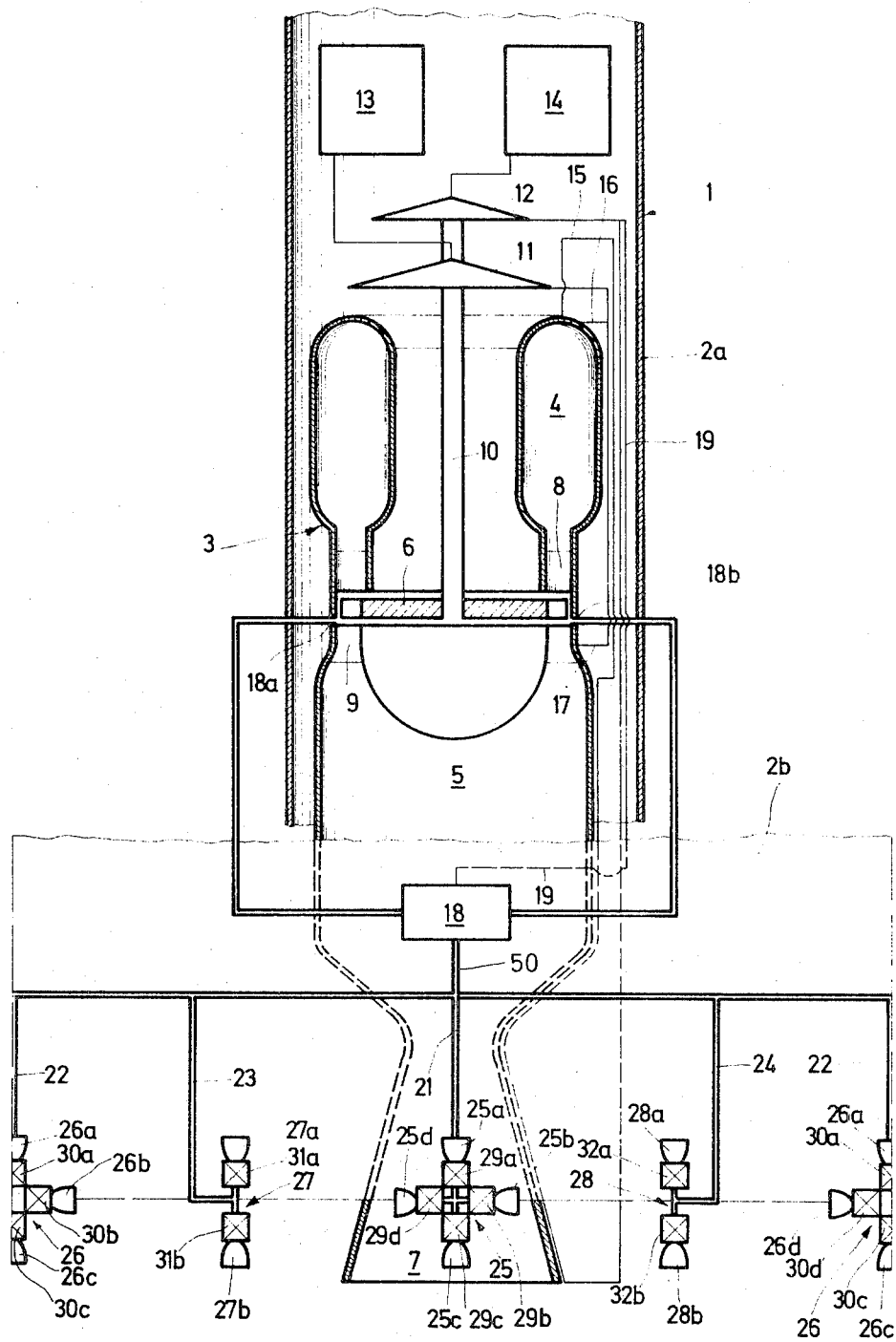

3,788,069

LIQUID FUELED ROCKET ENGINE OF THE MAIN CURRENT TYPE HAVING SEPARATE CONTROL NOZZLES OPERATED FROM TURBINE EXHAUST GASES BRANCHED OFF FROM THE ROCKET PROCESS

BACKGROUND OF THE INVENTION

1. Field of the Invention

This invention relates in general to the construction of rocket engines and in particular to a new and useful liquid fueled rocket engine of the main current type in which reaction gases are produced in an auxiliary combustion chamber and fed in series through an auxiliary pump drive turbine to a main combustion chamber for further reaction with additional amounts of one propellant component and wherein one or more control nozzles or control nozzle groups for regulating the orientation of the engine or the missile carrying the engine are supplied with the gases which are branched off from the rocket process at the turbine exhaust.

2. Description of the Prior Art

As a general rule, the main thrust producing rocket engine is mounted in a fixed location and is not pivotally supported on a missile so that it cannot produce control movements. The reason for this is the great constructional expenditure which would be required to pivotally mount the main engine, because of the requirement of strong and therefore heavier adjusting motors and further because of the great risk of seizing of the moving parts which would exist under the extreme operating conditions. For this reason, one or several nozzles or nozzle groups of varying thrust directions having separate propellant supplies which are supplied from the main engine are associated with the missile for the purpose of controlling the orientation thereof. It has been proposed that liquid fueled rocket engines of the main current type may include control nozzles which are supplied from turbine exhaust gases which are branched off from the rocket process in order to reduce the additional weight which will result from the separation of the propellant supply. However, the high temperatures of the branched off thrust gases reduces the life expectancy and operability of the valves connected in series with the control nozzles or nozzle groups as well as the moving line parts if any.

SUMMARY OF THE INVENTION

In accordance with the invention, a liquid-fueled rocket engine of the main current type is provided which has a space and weight saving control engine system of high reliability. With the inventive arrangement, small partial amounts of propellant components are added in liquid form to gases which are discharged from the auxiliary turbine and these mixed gases and fuel components are directed to the separate control nozzles or control nozzle groups.

With the inventive construction, a liquid fueled rocket engine will not require additional undesired weight increase which would result from a propellant supply for the control engine system which is separate from the main engine. In addition, there are no temperature dependent technological difficulties in respect to the moving parts associated with such a system including the connecting lines leading to the control nozzles and the switching valves associated with the control nozzles. This latter advantage is due to the fact that it is easy to mix small amounts of liquid propellant to the branched off turbine exhaust gases. The arrangement makes it possible to reduce the temperature of the branched off turbine exhaust gases to the required extent without the total propulsion thrust being reduced to any great extent.

In a rocket system in which liquid oxygen is used as an oxidizer and liquid hydrogen as a fuel, it is advisable to add small partial amounts of liquid hydrogen to the branched off turbine exhaust gases because of the greater specific cooling power of the hydrogen and because the turbine exhaust gases are already rich in hydrogen.

Accordingly, it is an object of the invention to provide an improved system for controlling the orientation of a rocket engine and associated missile which includes one or more control nozzles which are supplied with reaction gases from the reaction process at the location of the auxiliary turbine discharge and which are admixed with a propellant component and delivered to the individual control nozzles for regulating the movement of the missile or rocket engine about an axis.

A further object of the invention is to provide a rocket engine system which includes one or more control nozzle groups for turning the rocket or the missile associated therewith about selected axes and which are connected to the exhaust gas discharge of the auxiliary turbine for branching off a portion of the gas discharge at the location where it is delivered to the combustion chamber and for delivering this gas discharge to the control nozzles after it is first admixed with a propellant component such as liquid hydrogen.

A further object of the invention is to provide a rocket engine having separately operable control nozzles and which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

The only FIGURE of the drawings is a schematic partial longitudinal sectional view of a missile having a rocket engine of the main current type constructed in accordance with the invention and with the lower portion of the missile being shown in a development in order to indicate the positioning of each of the control nozzle groups.

GENERAL DESCRIPTION OF THE PREFERRED EMBODIMENT

Referring to the drawing in particular, the invention embodied therein, comprises a rocket propelled missile generally designated 1 having a shell 2a which is shown in longitudinal section at the upper portion of the drawing and which is also shown as a partial development at 2b for the purpose of indicating the arrangement of the various control nozzle groups thereon which are provided for regulating the orientation of the missle and for turning it about one or more axes.

In accordance with the invention, the drive for the missile 1 comprises a liquid fueled rocket engine generally designated 3 which is of the so-called main current type in which the combustion gases are generated in a precombustion chamber and thereafter directed in series to a fuel component pump drive turbine for operating the turbine and are subsequently directed into a main combustion chamber for further reaction with additional amounts of one propellant component for generating thrust gases which are discharged through a thrust gas discharge nozzle opening 7. The rocket engine 3 includes an auxiliary combustion chamber 4, which, in the embodiment shown, comprise a single annular chamber arranged upstream of a main combustion chamber 5. An axuiliary turbine 6 is arranged in the connection between the combustion chamber 5 and the auxiliary combustion chamber 4 and is operated from the gases generated in the auxiliary combustion chamber and it has a discharge which is connected into the main combustion chamber 5. The gases in the combustion chamber 5 are reacted with additional amounts of one propellant component and thrust gases are generated which are directed outwardly through a thrust nozzle 7. In the arrangement shown, a guide grid 8 is arranged between the auxiliary combustion chamber 4 and the turbine 6 and a delayed grid 9 is located between the auxiliary turbine 6 and the combustion chamber 5.

The auxiliary turbine 6 includes a shaft 10 which is connected to drive two auxiliary pumps 11 and 12 which provide the pumping power for delivering propellant components from separate storage tanks 13 and 14, respectively. One propellant component, such as liquid hydrogen, is conducted first through the wall of the main thrust nozzle 7 and the main combustion chamber 5 before it is fed through a line 15 into the auxiliary combustion chamber 4 where it reacts with a part of the other propellant component such as liquid oxygen forming a fuel rich propellant gas. The hydrogen is fed from the storage tank 14 by the pump 12 through the wall of the combustion chamber and is then branched back through line 15 to the inner end of the precombustion chamber 4. The oxygen component is delivered from the tank 13 by the pump 11 partly directly into the precombustion chamber 4 and partly through line 17 to the delay grid 9 for introduction at the delay grid into the inner end of a main combustion chamber 5. At this location, the oxygen is added to the fuel rich propellant gases which are expanded in the auxiliary turbine 6 and discharged through the delay grid 9.

In accordance with the invention, small partial amonts of the propellant gases which are expanded in the auxiliary turbine 6 are branched off before they enter the delay grid 9, for example at two diametrically opposied points 18a and 18b, and they are fed to a mixing chamber 18. A branch line 19 also connects into the mixing chamber 18 and it is supplied with a propellant component for example by the pump 12 from the hydrogen storage container 14, and this propellant component provides a cooling effect on the gases which are tapped from the gas turbine discharge.

The mixing chamber 18 is connected through a common line 50 which is connected to individual branch lines 21, 22, 23, and 24 which are connected to control nozzle groups 25, 26, 27 and 28, respectively. The control nozzle groups are distributed evenly around the circumference of the engine. Two of the control nozzle groups, groups 27 and 28 have two axially oppositely directed nozzles and two groups 25 and 26 have four control nozzles each 25a, 25b, 25c, and 25d; and 26a, 26b, 26c, and 26d; and have associated series connected valves 29a, 29b, 29c, and 29d; and 30a, 30b, 30c, and 30d, respectively. In the arrangement shown, there are four nozzles of the respective groups which provide a control thrust in a direction opposite to the main thrust direction, namely, nozzles 25a, 26a, 27a, and 28a. There is also one nozzle in each group having a control thrust in the same direction as the main thrust direction, namely, nozzles 25c, 26c, 27b and 28b. Nozzles 25b and 26b have a tangential clockwise control thrust direction and nozzles 25d and 26d have a tangential counterclockwise control thrust direction. Valves 31a and 31b, and 32a and 32b are associated with the groups 27 and 28 and are arranged in series with the control nozzles 27a and 27b and 28a and 28b, respectively.

While a specific embodiment of the invention has been shown and described in detail to illustrate the application of the principles of the invention, it will be understood that the invention may be embodied otherwise without departing from such principles.

What is claimed is:

1. A liquid fueled rocket engine of the so-called main current type having a plurality of control axes about which it may be turned, comprising wall means defining an auxiliary combustion chamber and a separate main combustion chamber having a thrust nozzle portion terminating in a thrust gas discharge, an auxiliary drive turbine located between said auxiliary combustion chamber and said main combustion chamber, means for directing at least two separate first and second propellant components into said auxiliary combustion chamber with said first propellant being in excess and for generating first propellant component-rich reaction pressure gases therein, said auxiliary combustion chamber being connected to direct the reaction gases through said gas turbine to drive said turbine and said turbine being connected to discharge into said main combustion chamber, means for introducing additional amounts of said second propellant component into said main combustion chamber for further reaction with the gases discharged from said turbine to generate thrust gases for discharge from said main combustion chamber, at least one control nozzle carried by said rocket engine having a thrust gas discharge directed to provide a turning thrust for controlling the position of said engine, a connection extending between the discharge of said gas turbine and said control nozzle, and means for introducing said first propellant component into the connection for cooling the gases delivered to the control nozzle.

2. A liquid fueled rocket engine, according to claim 1, wherein liquid oxygen and liquid hydrogen are used as propellant components and wherein the liquid hydrogen is added to said connection.

3. A liquid fueled rocket engine, according to claim 1, wherein said connection includes a mixing chamber, said exhaust gases being connected into said mixing chamber and a separate propellant component connection connected into said mixing chamber for supplying said propellant component, said mixing chamber discharging into said control nozzle.

4. A liquid fueled rocket engine, according to claim 1, including first and second fuel components storage tanks, said turbine having a drive shaft, first and second pumps carried by said drive shaft driven by said turbine and connected respectively to said first and second storage tanks and to said auxiliary combustion chamber for delivering the fuel components to said auxiliary combustion chamber and connected to said main combustion chamber for delivering said propellant component to said main combustion chamber.

5. A liquid fueled rocket engine, according to claim 1, wherein one of said propellant components is liquid hydrogen which is directed through the wall of said main combustion chamber to cool said main combustion chamber before it is introduced into said auxiliary combustion chamber.

6. A liquid fueled rocket engine, according to claim 1, wherein said at least one control nozzle comprises a plurality of control nozzle groups each group having a nozzle oriented in the same direction as the main thrust from the main combustion chamber and a control nozzle located in a direction to effect a thrust in an opposite direction.

7. A liquid fueled rocket engine, according to claim 1, wherein said at least one control nozzle comprises at least one group having a control thrust discharge both in a same direction as the main thrust gas discharge and in an opposite direction thereto, and wherein there is at least one control nozzle group having a control thrust discharge in a direction of clockwise rotation and in a direction of counterclockwise rotation of said engine.

8. A method of operating a rocket engine of the main current type in which reaction gases are generated in an auxiliary combustion chamber and expanded in a gas turbine before they are delivered to a main combustion chamber in which they are further reacted with additional amounts of one propellant component therein and wherein there is at least one control nozzle for controlling the position of the rocket engine, comprising supplying propellants to the auxiliary combustion chamber for reaction therein to generate gases using at least some of the gases to drive the gas turbine and to be exhausted therefrom, tapping at least some of the exhaust gases of the turbine after they are discharged from the turbine and before they are directed into the main combustion chamber cooling the tapped gases, and directing them into said control nozzle for generating control thrust.

9. A method, according to claim 8, wherein the gases are cooled by adding a propellant component to them before they are delivered to the control nozzle.

* * * * *